United States Patent [19]

Alvarez

[11] Patent Number: 5,572,020
[45] Date of Patent: Nov. 5, 1996

[54] SIMPLIFIED RADON TESTING PACKAGE

[76] Inventor: Bernard V. Alvarez, 570 Butler Bridge Rd., Fletcher, N.C. 28732

[21] Appl. No.: 580,765

[22] Filed: Dec. 29, 1995

[51] Int. Cl.$^6$ ................................................. G01T 1/00
[52] U.S. Cl. .................... 250/253; 250/255; 250/DIG. 2
[58] Field of Search .......................... 250/DIG. 2, 253, 250/255

[56] References Cited

U.S. PATENT DOCUMENTS

| | | | |
|---|---|---|---|
| 4,700,070 | 10/1987 | Kovac | 250/304 |
| 4,874,494 | 7/1989 | Alvarez | 250/253 |
| 5,070,247 | 12/1991 | Wiblin | 250/472.1 |

OTHER PUBLICATIONS

1995 Air Chek, Inc. Radon Test Kit instruction sheet (Mar. 1995).

*Primary Examiner*—Constantine Hannaher
*Attorney, Agent, or Firm*—Carter & Schnedler, P.A.

[57] ABSTRACT

A radon test package of simplified and low cost construction. A generally flat outer packet is formed from a single sheet of radon barrier material folded to define two panels with facing inner surfaces sealed along side edge portions, leaving a closeable open edge portion. The outer packet is expandable so as to define a chamber, having an access opening corresponding to the open edge portion. The facing inner surfaces have a surface layer of fusible low density polyethylene, and a sheet of gas-permeable kraft paper is adhered by heat sealing directly to the inner surface of one of the panels in an adhesion pattern which defines a closed triangular pocket containing activated charcoal. When the packet is expanded, the access opening is square, and a block of open cell foam material is inserted to maintain the opening in a standardized configuration, as well as to eliminate the effect of air currents. The two panels are substantially the same size, and there is an adhesive strip on the inner surface of one of the panels immediately adjacent the opening for sealing the access opening closed at the conclusion of a testing period.

26 Claims, 6 Drawing Sheets

SIMPLIFIED RADON TESTING PACKAGE

BACKGROUND OF THE INVENTION

The present invention relates generally to radon testing packages containing a radon collecting material such as activated charcoal and, more particularly, to a radon testing package of more simplified construction with an increase in test accuracy. The subject radon testing package is an improvement over the package disclosed in Alvarez U.S. Pat. No. 4,847,494, the entire disclosure of which is hereby expressly incorporated by reference.

Radon is a heavy radioactive gaseous element, which exists naturally in the environment, and is found in most soil gases. Radon levels may vary considerably at different sites, and over time at any given site. Because naturally occurring radon levels are now known to sometimes be high enough to cause health concerns, various testing products have been introduced to aid in the detection of radon at a particular location. In general, some such radon detection products take the form of a sealable package of radon adsorption material, most commonly activated charcoal. The package is situated in an area to be tested and opened so that the activated charcoal is exposed to the ambient air for a measured testing period. At the conclusion of the testing period, the package is sealed. The activated charcoal or other radon adsorption material is later analyzed to determine the level of radon, if any, adsorbed thereby. In this manner, a given test site, such as a room or basement of a house or building, may be tested for the presence and/or level of radon therein.

Various factors give rise to variations in naturally-existing radon levels at any one time, such as atmospheric pressure changes. For example low pressure centers, such as storms, may draw higher levels of soil gas from the ground. Radon levels may change radically in the course of only a few hours. Thus it is desirable to have testing periods extend over several days, so that an average level of radon for a given test area is thereby determined. Such an average level accordingly reflects a truer indication of the potential annual radon levels at the test site.

The above-incorporated Alvarez U.S. Pat. No. 4,847,494 discloses a radon detecting package which has a somewhat balanced radon adsorption and retention characteristic so as to permit a practical testing period of about two days. The activated charcoal in that package design adsorbs during such a testing period an adequate amount of radon for detection purposes, usually without collecting a deleterious amount of moisture. While radon typically is rapidly taken on or adsorbed by commonly employed radon adsorption materials (e.g. activated charcoal) the adsorbed radon is subsequently driven off from the activated charcoal by the absorption of moisture as the test proceeds. The radon testing package of Alvarez U.S. Pat. No. 4,847,494 provides for a somewhat controlled amount of the ambient gases and water vapor to have access to a pouch of adsorption material during a testing period. Static ambient gases are allowed to adsorb onto the activated charcoal somewhat more slowly than the more common open designs thus effectively integrating the adsorption over an extended period.

More particularly in the radon testing package disclosed in Alvarez U.S. Pat. No. 4,847,494, a flexible generally flat packet is made of radon barrier material, and is expandable so as to define a cone-shaped chamber within the envelope which includes an opening for access to ambient gases. Supported within the flexible outer radon barrier material is a pouch made of a folded sheet of gas-permeable material, in particular, Tyvek®, a paper-like product formed of non-woven polyethylene fibers. Tyvek® is a product of the E.I. DuPont Corporation, Wilimington, Del. Activated charcoal is enclosed within the Tyvek pouch, and is retained by heat sealing. In particular, the three unfolded edge portions of the Tyvek panel are heat sealed between corresponding edge portions of the flexible outer packet of radon barrier material during manufacture of the package. During such heat sealing, the material of the flexible outer packet prevents direct contact of the heat sealing tool against the Tyvek material.

For holding the packet open to establish a predetermined degree of access to ambient air to the pouch of activated charcoal, the package of Alvarez U.S. Pat. No. 4,847,494 employs a folded cardboard insert, which resembles a paper airplane. The "paper airplane" is inserted into the packet opening during a test, and subsequently removed.

For sealing the access opening at the conclusion of the test, the package disclosed in Alvarez U.S. Pat. No. 4,847,494 has an adhesive strip on a fold-over flap, which is used to seal the package in a manner similar to a conventional envelope, forming a self-mailer whereby the test package can conveniently be mailed to a testing laboratory for analysis.

While generally effective for its intended purpose, the radon testing package of Alvarez U.S. Pat. No. 4,847,494 nevertheless is subject to improvement, particularly in the area of cost reduction and automated manufacture.

In addition, a disadvantage of the radon testing package as disclosed in Alvarez U.S. Pat. No. 4,847,494 is that accurate test results may not be achieved in the presence of increased air currents. Air blowing on or near an activated charcoal sampler may increase its sensitivity to radon, yielding test results indicating erroneously high levels of radon. Accordingly, the instructions included with most radon testing packages state clearly that the device should not be placed in a draft, and should not be placed in the same room with any type of operating fan or blower. Despite these instructions, there nevertheless remains the possibility that some users may ignore the instructions, and conduct the test in the presence of abnormal air currents.

SUMMARY OF THE INVENTION

It is accordingly an object of the invention to provide a radon testing package which is simplified in construction to permit automated manufacture, at a lower cost.

It is another object of the invention to further improve the accuracy of the testing results provided by the package disclosed in Alvarez U.S. Pat. No. 4,847,494.

It is a related object of invention to provide a radon testing package having reduced sensitivity to air currents.

The subject invention accordingly provides a radon testing package construction which is simplified and improved in a number of respects, and which permits corresponding simplified methods of manufacture.

As one aspect of the invention, the separate inner pouch of folded Tyvek as disclosed in Alvarez U.S. Pat. No. 4,847,494 is replaced by a single unfolded sheet of ordinary kraft paper adhered directly to the inner surface of the outer packet material in an adhesion pattern which defines a closed pocket containing the activated charcoal radon collecting material. Ordinary kraft paper has a gas permeability similar to that of Tyvek.

More particularly, the package of the invention includes a generally flat, flexible outer packet formed of two panels of radon barrier material joined along sealed edge portions with a closeable open edge portion. The packet is expandable so as to define a cone-shaped chamber therewithin with an opening corresponding to the open edge portion for providing selected access to the chamber.

Preferably, the panels of radon barrier material are rectangular and are permanently joined along three edges. More particularly, the panels of radon barrier material preferably are formed from a single sheet of stock material, folded to create or define the two panels and one of the three joined edges opposite the opening, and then sealed along two opposite sides to define the other two of the joined portions. Thus one of the edges defining the joined/sealed edge portions preferably is a fold of continuous radon barrier material.

In preferred embodiments, the facing inner surfaces of the panels comprise a layer of fusible material, such as low density polyethylene, to facilitate heat sealing, as well as to facilitate adhesion of the sheet of kraft paper which forms the closed pocket containing activated charcoal.

Thus the sheet of gas-permeable material is adhered to the inner surface of one of the panels by the application of pressure and heat such that portions of the layer of fusible material penetrate into the sheet of gas-permeable material, in what may be viewed as a form of heat sealing.

In preferred embodiments the access opening is square when the outer packet is expanded, at least one of the panels forms three generally triangular subpanels joined by crease lines extending from the midpoint of the open edge portion to respective corners of the outer packet opposite the opening. Correspondingly, the closed pocket of activated charcoal preferably is triangular, and is oriented with one vertex of the triangle adjacent the open edge portion and with two sides of the triangle extending from the one vertex to respective corners of the outer packet generally along the creases. This package construction allows an access opening and chamber of consistent and standardized geometry from package to package, thus facilitating more accurate test results.

For maintaining the access opening in a standardized configuration, rather than the "paper airplane" insert as disclosed in Alvarez U.S. Pat. No. 4,847,494, a body or block of open cell foam material is provided which is selectively insertable within the access opening. A convenient pull tab is attached to the body to facilitate and encourage removal from the opening at the conclusion of the testing, and prior to closing the open edge portion. In addition to maintaining the access opening in a standardized configuration, the body of open cell foam material serves to eliminate the effect of any air currents within the test area.

A corresponding method of making a radon testing package includes the steps of providing a sheet of flexible radon barrier material having a layer of fusible material on one side, and then placing the sheet of gas permeable material, such as kraft paper, against a portion of the sheet of radon barrier material on the fusible material side. The sheet of gas permeable material is then adhered to the sheet of radon barrier material in an adhesion pattern defining an open pocket having a pocket opening, by sufficiently heating portions of the layer of fusible material while pressing the sheet of gas permeable material and the sheet of radon barrier material together in the adhesion pattern, employing for example a suitable heated tool, such that fusible material penetrates into the sheet of gas permeable material. A quantity of radon collecting material, such as activated charcoal, is inserted into the pocket through the pocket opening, and the pocket opening is thereafter closed by sufficiently heating a second portion of the layer of fusible material, again while pressing the sheet of gas permeable material and the sheet of radon barrier material together at the pocket opening such that fusible material penetrates into the sheet of gas permeable material. The sheet of radon barrier material is then folded to define two opposing panels having facing inner surfaces of fusible material. Opposite side edges of the two panels are then heat sealed to form the expandable outer packet having an access opening.

As another aspect of the invention, the fold-over adhesive sealing flap of Alvarez U.S. Pat. No. 4,847,494 is eliminated, and an adhesive strip is provided on an inner surface of one of the panels immediately adjacent the open edge portion for sealing the access opening closed at the conclusion of the testing period. Thus, the two panels can be substantially the same size.

BRIEF DESCRIPTION OF THE DRAWINGS

While the novel features are set forth with particularity in the appended claims, the invention, both as to organization and content, will be better understood and appreciated from the following detailed description, taken in conjunction with the drawings, in which:

DETAILED DESCRIPTION

Figure 1:
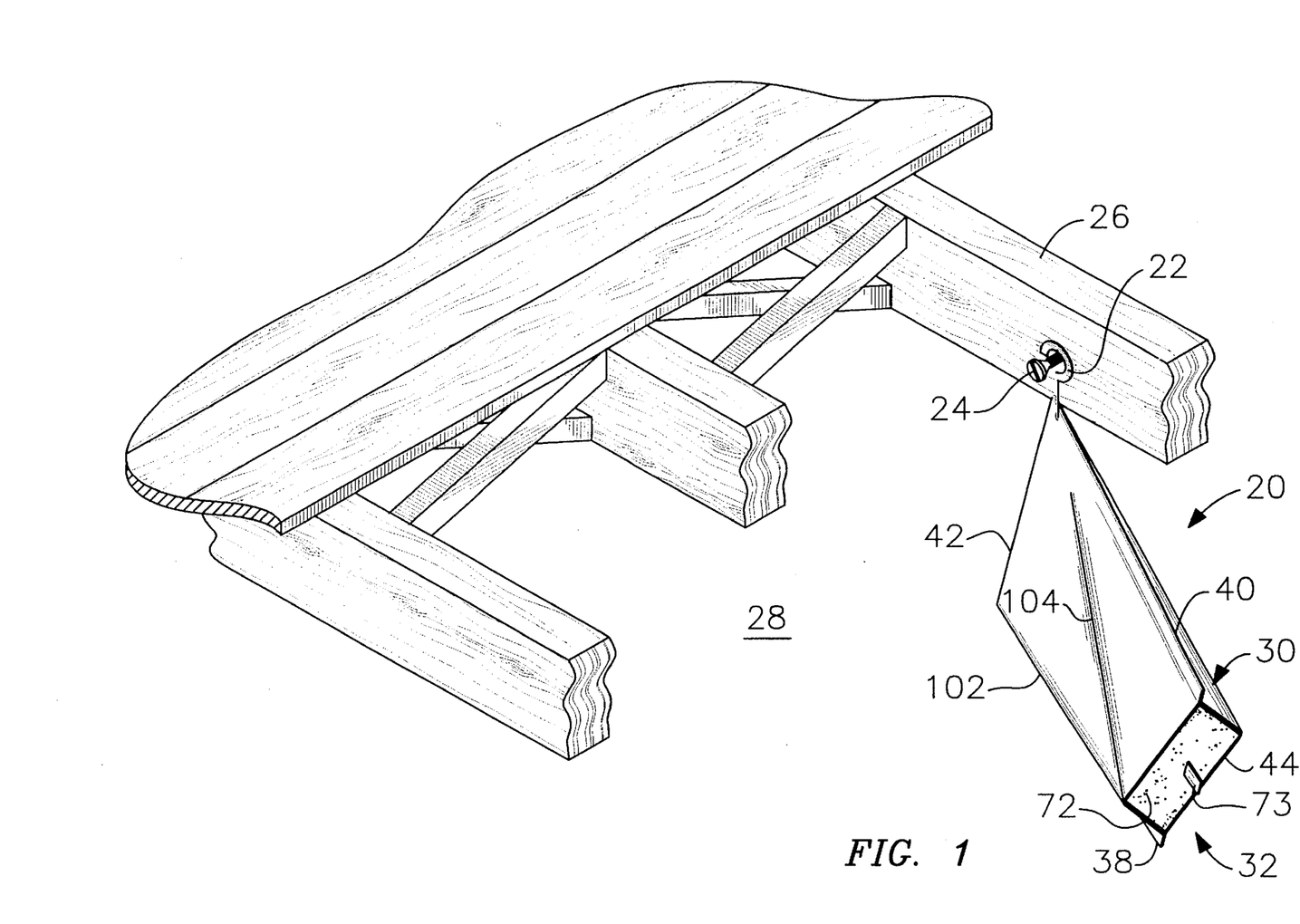
FIG. 1 illustrates a package in accordance with the invention in its expanded configuration hung in a test area during a testing period, with the package swung out for purposes of illustrations.

With reference first to FIG. 1, a radon testing package 20 in accordance with the invention is suspended by an included plastic hook 22, illustratively attached to a nail or screw 24 on a ceiling joist 26, in a test area generally designated 28. The package 20 as depicted in FIG. 1 includes an outer packet 30, formed of radon barrier material, and is expanded to define an access opening 32 for air and a sample of any radon present in the test area 28.

With reference to FIGS. 2–5, in addition to FIG. 1, the outer packet 30 more particularly is formed of two panels 34 and 36 of radon barrier material, joined along three sealed edge portions 38, 40 and 42, with a closeable open edge portion 44 corresponding to the access opening 32. The outer packet 30 is expandable so as to define a chamber 46 therewithin, in addition to defining the opening 32 which provides selected access to the chamber 46.

The panels 34 and 36 have facing inner surfaces 54 and 56, which surfaces 54 and 56 comprise a layer of fusible material, such as low density polyethylene. The layered nature of the radon barrier material forming the panels 34 and 36 is described in greater detail hereinbelow with reference to FIGS. 8 and 9.

Figure 6:
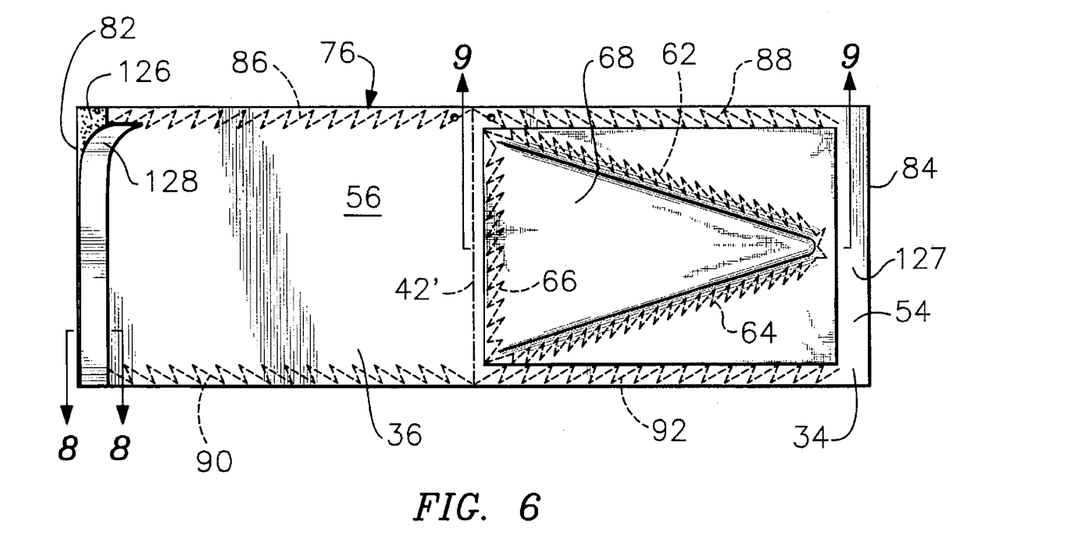
FIG. 6 is a view of the radon testing package of FIG. 1 at an intermediate stage during manufacture.

Adhered to the inner surface 54 of panel 34 is a sheet 60 of gas permeable material, such as ordinary kraft paper. With reference also to FIG. 6, which depicts an intermediate step during manufacture, the kraft paper 60 is adhered to the inner surface 54 of panel 34 in a adhesion pattern represented by sealing lines 62, 64 and 66 defining a closed pocket 68 containing radon collecting material 70, such as particles of activated charcoal 70, between the kraft paper sheet 60 and the inner surface 54 of the panel 34.

Figure 2:
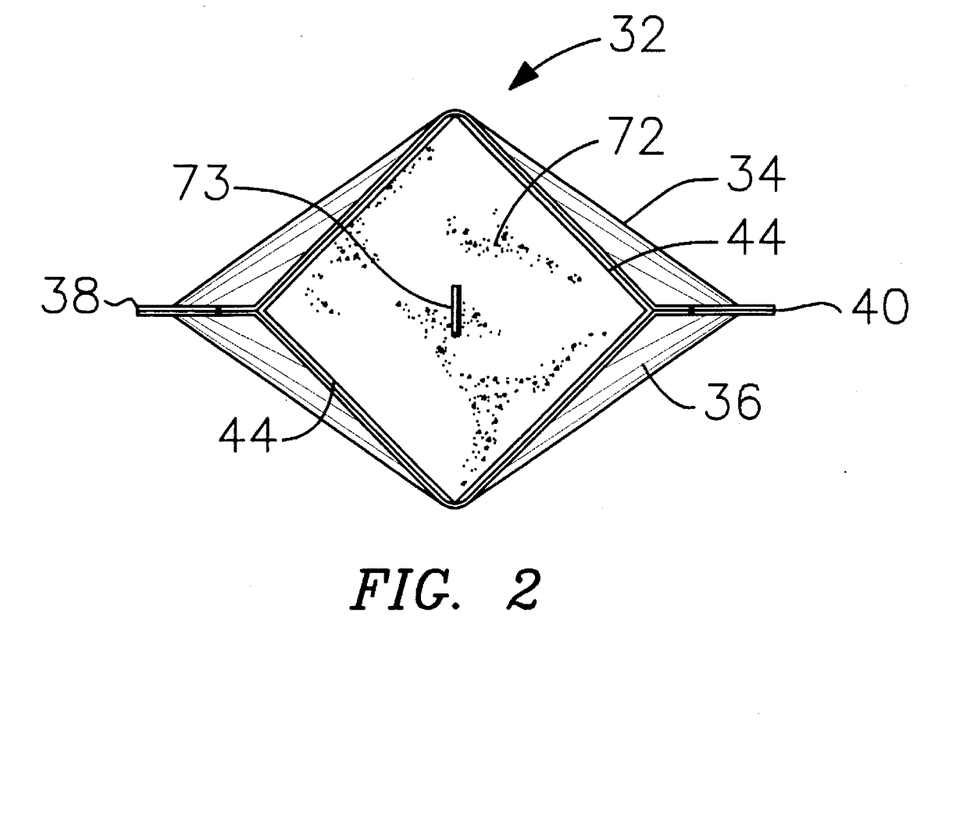
FIG. 2 is a view of the package directly in line with the lower access opening.
Figure 3:
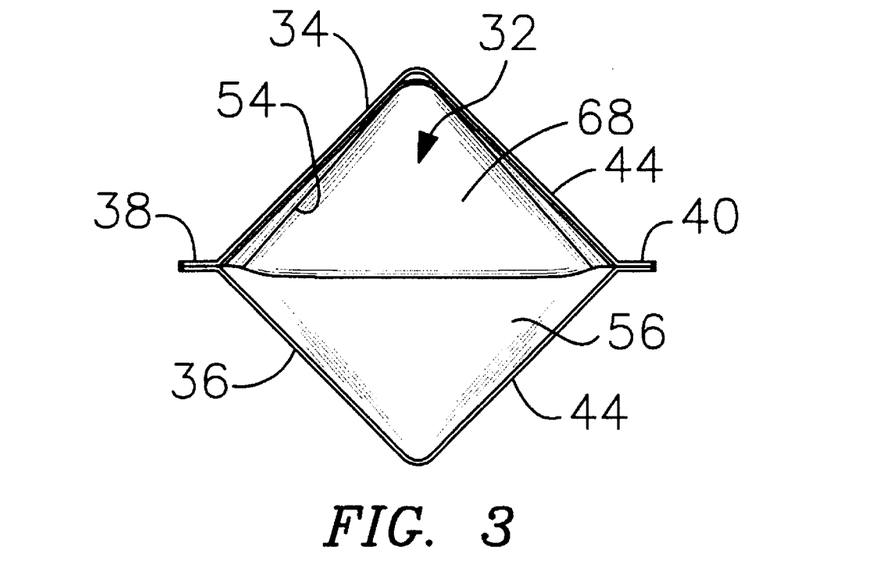
FIG. 3 is a view from an orientation similar to that of FIG. 2, but at a closer range and with the open cell foam block removed for purposes of illustration so that the interior can be viewed.
Figure 4:
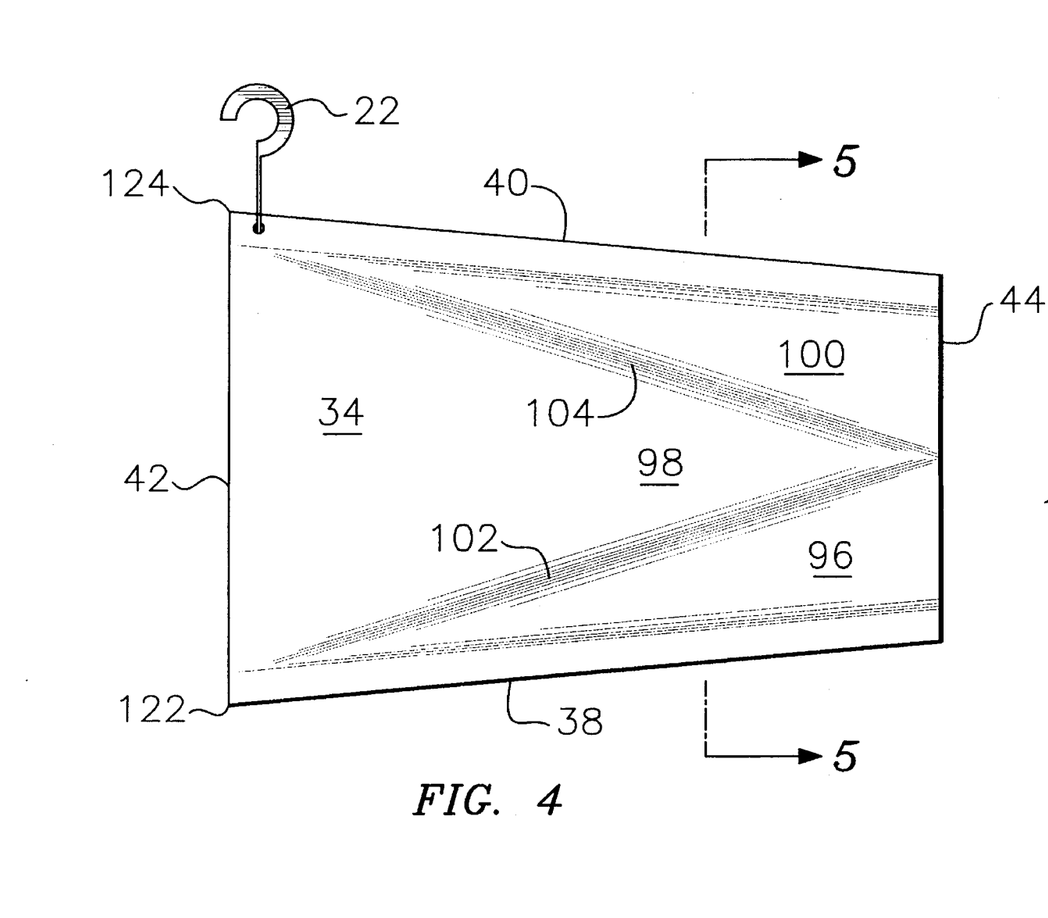
FIG. 4 is a side view of the package of FIG. 1 in its expanded configuration.
Figure 5:
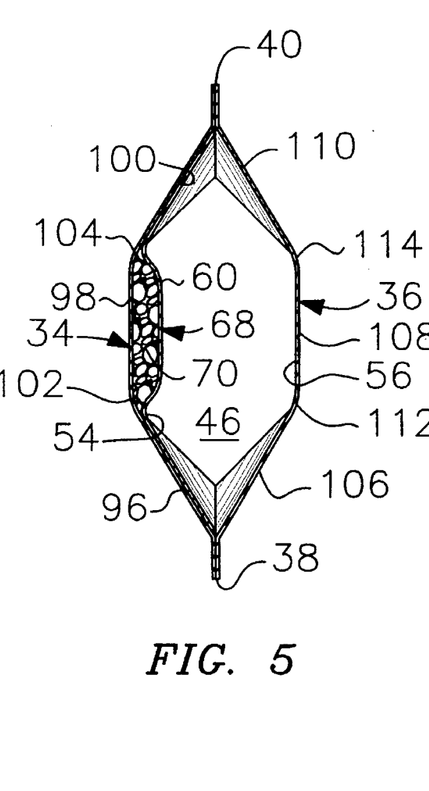
FIG. 5 is a cross-section on line 5—5 of FIG. 4, looking out of the access opening.

Preferably, as best seen in FIGS. 2 and 3, the access opening 32 is square, and, during use, is maintained in a standardized configuration by means of a body 72 of open cell foam material selectively insertable within the access opening 32. The body 72 of open cell foam material may be described as a foam block, and is shown in isolation in FIG. 7. The open cell foam material for example has a density of forty pores per inch (ppi), and is a material commonly employed in air filtering applications.

Figure 7:
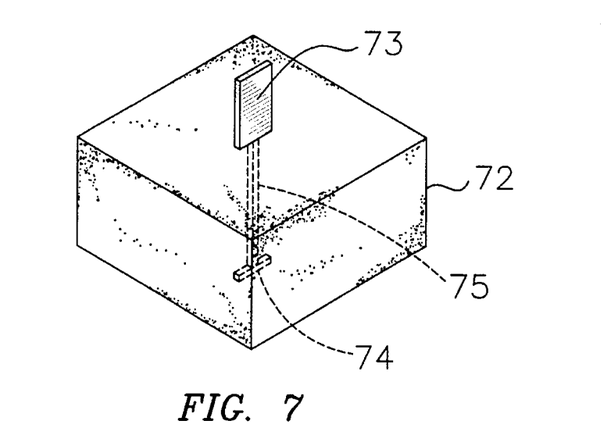
FIG. 7 is a three dimensional view showing in isolation the open cell foam block insertable into the access opening.

To facilitate removal of the foam block 72 at the conclusion of a test, a plastic pull tab 73 is provided, preferably of a contrasting color, such as a yellow pull tab 73 affixed to a black foam block 72 by means of a "T" end 74 at the end of a tab stem 75 driven through the block 72. Without the pull tab 73, there is a tendency for users to push the foam block 72 into the package 20, which could result in damage and sealing problems, rather than to properly remove and discard the foam block 72.

As is perhaps best seen in FIG. 6, the panels 34 and 36 are formed from a single rectangular sheet 76 of radon barrier material having opposite side edges 78 and 80, and two ends 82 and 84. The sheet 76 is ultimately folded along line 42' to define the sealed edge 42, and joined along opposite sides to form the other two sealed edge portions 38 and 40. Thus, and with reference to FIG. 6, along the side 78 a portion 86 of the inner surface 56 of the panel 36 is subsequently heat sealed to a portion 88 of the inner surface 54 of panel 34, to form the sealed edge 38. Along the side 80 a portion 90 of inner surface 56 of the panel 36 is subsequently heat sealed to a portion 92 of the inner surface 54 of panel 34 to form the other sealed edge 40. The ends 82 and 84 are juxtaposed, but are not sealed during manufacture.

Advantageously, and corresponding to the square access opening 32, the panels 34 and 36 each generally form three generally triangular subpanels when the package 20 is expanded. Thus, the panel 34, when expanded, forms three generally triangular subpanels 96, 98 and 100 joined by creases 102 and 104. The subpanel 36, when the package 20 is expanded forms subpanels 106, 108 and 110 joined by creases 112 and 114. It will be appreciated that the subpanels, particularly subpanels 106, 108 and 110 of the panel 36 not having the activated charcoal-containing pocket 68 attached, may be somewhat generally defined, with the creases 112 and 114 being in the form of gentle bends rather than being sharply defined.

Consistent with and contributing to this geometry defining a standardized access opening 32, the pocket 68 containing the activated charcoal 70 preferably is triangular and is oriented with a vertex 120 adjacent the open edge portion 44, with two sides of the triangle corresponding to the sealing lines 62 and 64 extending generally along the creases 102 and 104, respectively.

It will appreciated that the creases 102 and 104 on the panel 34 extend generally from the midpoint of the open edge portion 44 to respective corners 122 and 124 of the outer packet 30 opposite the access opening 32, and the creases 112 and 114 on the panel 36 likewise extend from midpoint of the open edge portion to the respective corners 122 and 124 of the outer packet 30 opposite the access opening 32.

Another advantage of the triangular pocket 68 is that, when cut at the testing laboratory near the vertex 120, a funnel-like structure is formed for conveniently emptying the activated charcoal 70 into an instrument for analysis.

For sealing the access opening 32 closed at the conclusion of a testing period, an adhesive strip 126 is provided on the inner surface 56 of the panel 36 at the sheet edge 82', for adhering to corresponding surface 127 on the other panel 34 at the sheet edge 84. Having the adhesive strip 126 on the inner surface 56 allows the panels 34 and 36 to be the same size, with no need for a separate fold-over flap. The adhesive strip 126 is covered by a removable protective plastic strip 128 prior to use.

Figure 8:
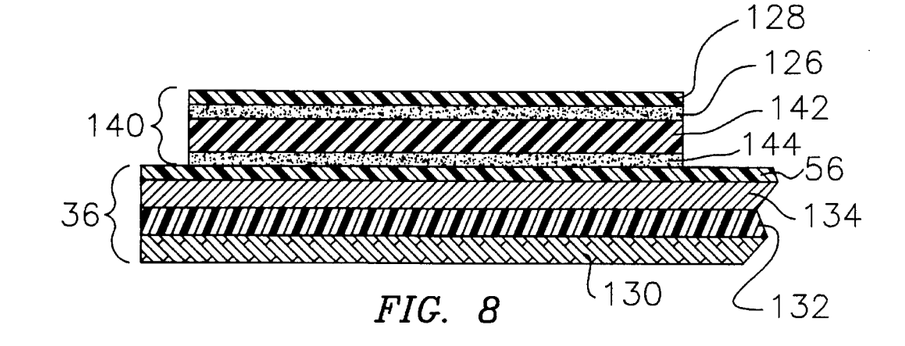
FIG. 8 is an enlarged cross-sectional view along line 8—8 of FIG. 6.

More particularly, and with reference to the enlarged cross-sectional view of FIG. 8, the panel 36 of radon barrier material comprises four layers, an outer layer 130 of clay-coated white kraft paper, a second layer of low density polyethylene 132, a radon barrier layer 134 of aluminum foil, and the inner layer 56 of low density polyethylene for heat sealing purposes. The polyethylene layer 132 serves to adhere the outer white kraft paper layer 130 to the radon barrier layer 134 during manufacture as the material is rolled between two heated rollers. This four-layer material 36 is available as a stock material.

The adhesive strip 126 more particularly comprises a portion of off-the-shelf double-sided tape 140, including the removable protective strip 128. Thus, the double-sided tape 140 additionally includes a base material layer 142, and an adhesive layer 144 by which the strip of tape 140 including the adhesive strip 126 is adhered to the panel 36.

Figure 9:
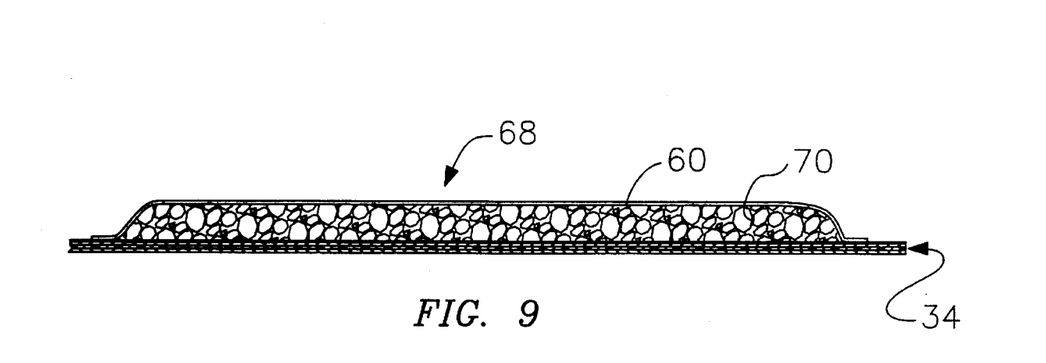
FIG. 9 is a cross section along line 9—9 of FIG. 6, showing the closed pocket of activated charcoal radon collecting material.

The cross-sectional view of FIG. 9 depicts the manner in which the layer of radon impermeable kraft paper 60 is adhered to the inner surface 54 to define the triangular pocket 68 containing the activated charcoal 70. Thus, heated portions of the layer 54 of fusible material penetrate into the kraft paper sheet 60, under the influence of a heated tool of suitable configuration.

One of the advantages of employing kraft paper 60 to form the pocket 68 is that a heat sealing tool may be placed directly against the kraft paper. Such is not feasible with a Tyvek pouch as employed in the construction disclosed in Alvarez U.S. Pat. No. 4,847,497 as discussed hereinabove.

It will be appreciated that the package construction described hereinabove is capable of being manufactured relatively inexpensively, either by manual operation, or by automated machine.

Thus, a method of making a radon testing package begins by providing the sheet 76 of flexible radon barrier material, having the layer of fusible material on one side. The sheet 60 of kraft paper, which is a gas permeable material, is placed against a portion of the sheet 76 of radon barrier material on the fusible material side. The sheet 60 of kraft paper is then adhered to the radon barrier material in an adhesion pattern represented by the lines 62 and 64 to define a pocket having a pocket opening. This adhesion is accomplished by employing a heated die, such as a V-shape die, in direct contact with the kraft paper 60 (not possible with Tyvek), pressing the kraft paper 60 and the outer packet material 76 together, against a support on the opposite side of the outer packet material 76. A measured quantity of activated charcoal 70 is then placed into the pocket 68 through the pocket opening, and the pocket opening is then closed by sealing along the line 66 in the same manner as along the lines 62 and 64, employing a suitable heated tool.

The sheet 76 is then folded along the line 42' to define the two opposing panels 34 and 36 having facing inner surfaces 54 and 56 of fusible material, which are then heat sealed along the edges 38 and 40. Prior to this final heat sealing operation, the adhesive strip 126 comprising a portion of the double-sided tape 140 is applied.

Although in FIG. 6 the layer of kraft paper 60 is shown entirely within a region between the heat seal regions 88 and 92, strict tolerances are not involved, as no particular harm is done in the event the kraft paper 60 encroaches into the heat sealing areas 88 and 92.

Figure 10:
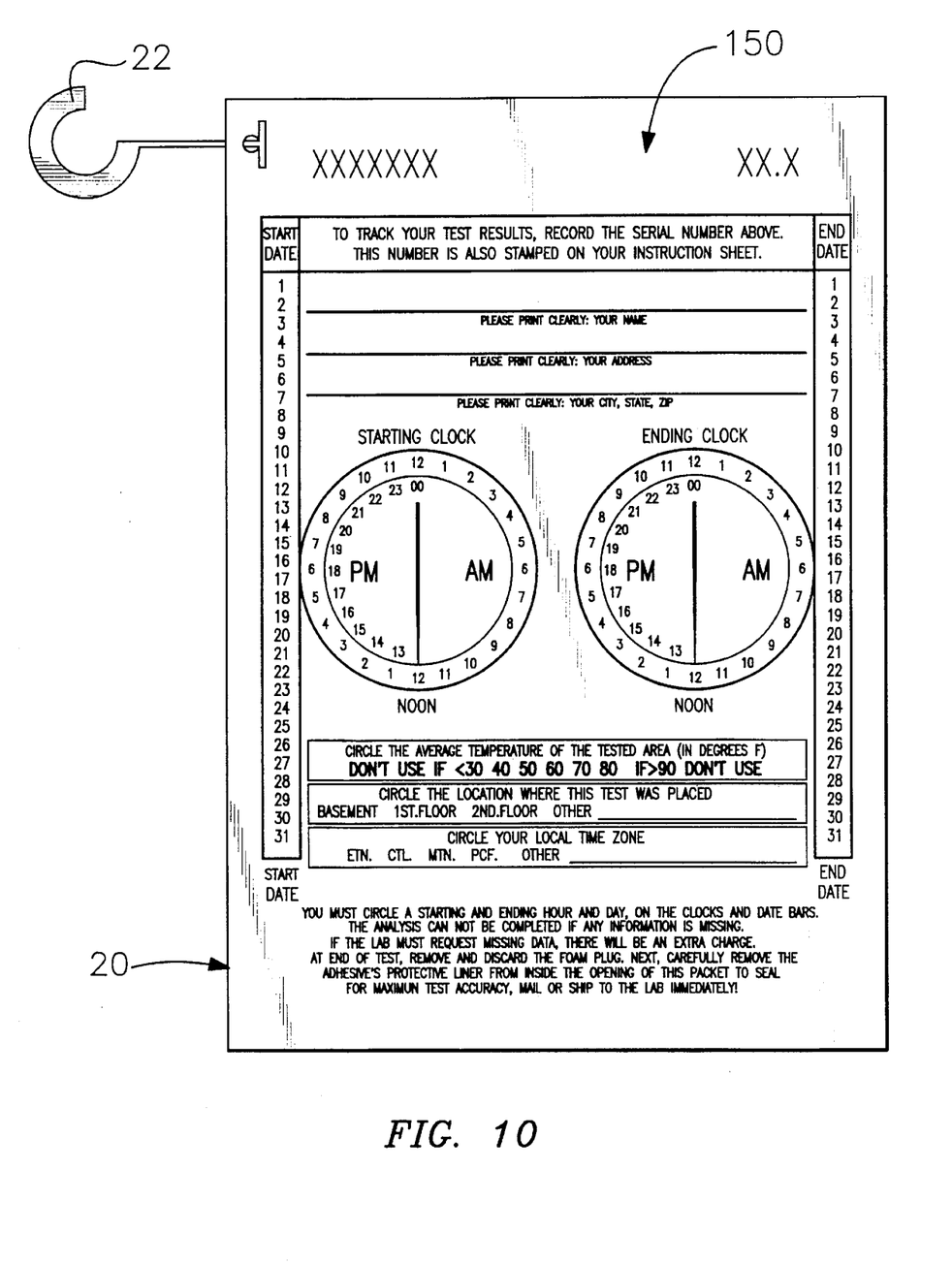
FIG. 10 is a view of one side of the radon testing package of the invention when in a generally flat configuration.
Figure 11:
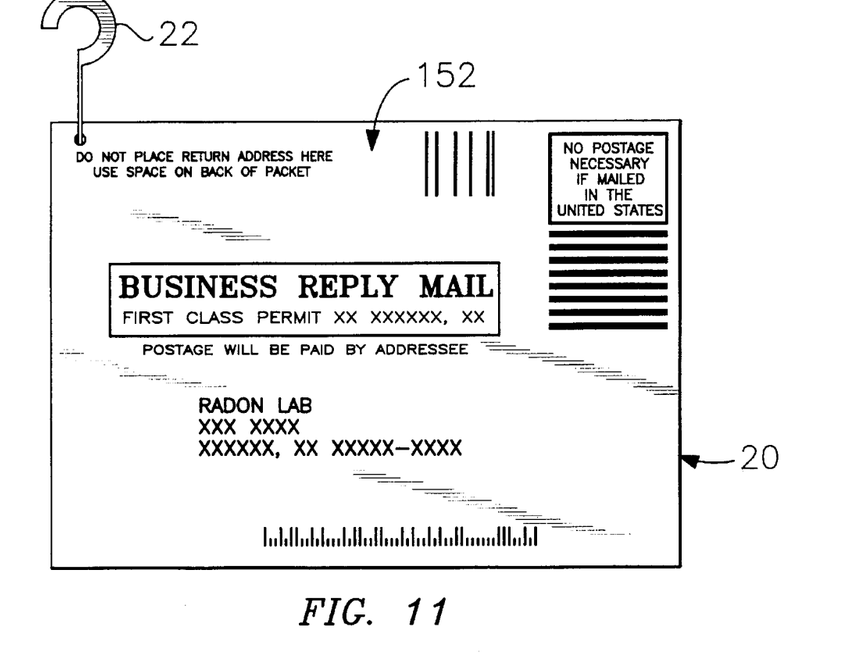
FIG. 11 is a similar view of the opposite side of the package.

Referring to finally to FIGS. 10 and 11, the package 20 advantageously forms a self-mailer, with indicia 150 printed on one side (FIG. 10) for recording the starting and ending times and dates, and other relevant data, to enable proper analysis of the test results. Address indicia 152 are printed on the other side (FIG. 11) for convenient and rapid mailing of the testing package to an analysis lab at the conclusion of a testing period.

The testing package 20 is sold in a generally flat configuration, sealed within a gas-tight plastic outer package (not shown) along with the foam block 72 and a sheet of instructions (not shown). For use, the plastic outer package is opened, the testing package 20 is removed therefrom, and the indicia side 150 is partially filled out, in particular, the name and address of the user, as well as the starting time and date.

The user then pushes together the opposite side edges 38 and 40 to expand the outer packet 20, and to form the square access opening 32. If necessary, the package 20 is manipulated to form the desired configuration with a square access opening 32, and the foam block 72 is inserted into the opening 32.

The package 20 is then hung, from the hook 22, within the area 28 to be tested, at a normal breathing height above the floor, for a test period of from two to seven days. During the test period, a sample of radon present in the test area 28 is conducted into the chamber 46 through the open-cell foam material body 72 and collected by adsorption by the particles of the activated charcoal material 70.

At the conclusion of the test, the foam block 72 is removed by pulling on the tab 73, and discarded. The edges 44 at the opening 32 are pulled apart sufficiently to remove the protective strip 128 over the adhesive strip 126, which is then used to seal the opening 32 closed. The indicia side 150 is completed, and the package 20 is then mailed to a testing laboratory, where the amount of collected radon is determined, and analyzed to produce a test report.

While specific embodiments of the invention have been illustrated and described herein, it is realized that numerous modifications and changes will occur to those skilled in the art. It is therefore to be understood that the appended claims are intended to cover all such modifications and changes as fall within the true spirit and scope of the invention.

What is claimed is:

1. A package for use in testing for the presence of radon in a given area, said package comprising:

a generally flat, flexible outer packet formed of two panels of radon barrier material joined along sealed edge portions with a closable open edge portion, said panels having facing inner surfaces, and said outer packet being expandable so as to define a chamber therewithin and an opening corresponding to said open edge portion for providing selected access to said chamber; and a sheet of gas permeable material adhered to the inner surface of one of said panels in an adhesion pattern defining a closed pocket containing radon collecting material between said sheet and said inner surface;

whereby any radon present in the given area may be conducted into the chamber through the opening and collected by said radon collecting material during a testing period, and thereafter retained within said packet by closing the open edge portion for subsequent detection of any such radon.

2. The package of claim 1, wherein the facing inner surfaces of said panels comprise a layer of fusible material.

3. The package of claim 2, wherein said sheet of gas permeable material is adhered to selected portions of said inner surface by penetration of portions of said layer of fusible material into said sheet of gas permeable material.

4. The package of claim 3, wherein said sheet of gas permeable material comprises kraft paper.

5. The package of claim 1, wherein said panels of radon barrier material are rectangular and are joined along three sealed edges defining the sealed edge portions.

6. The package of claim 5, wherein the facing inner surfaces of said panels comprise a layer of fusible material.

7. The package of claim 6, wherein at least two of the three sealed edges are joined by heat sealing.

8. The package of claim 6, wherein said sheet of gas permeable material is adhered to selected portions of said inner surface by penetration of portions of said layer of fusible material into said sheet of gas permeable material.

9. The package of claim 8, wherein said sheet of gas permeable material comprises kraft paper.

10. The package of claim 5, wherein said opening is square.

11. The package of claim 10, wherein, when said outer packet is expanded, at least one of said panels generally forms three generally triangular subpanels joined by creases extending from the midpoint of the open edge portion to respective corners of said outer packet opposite said opening.

12. The package of claim 11, wherein said closed pocket is triangular and is oriented with one vertex of the triangle adjacent said open edge portion, and with two sides of the triangle extending from the one vertex to respective corners of said outer packet generally along the creases.

13. The package of claim 5, wherein said panels of radon barrier material are formed from a single sheet of stock material folded to define one of the three sealed edges opposite said opening, and joined along two opposite sides to define the other two of the sealed edge portions.

14. The package of claim 13, wherein the facing inner surfaces of said panels comprise a layer of fusible material.

15. The package of claim 14, wherein the edges along the two opposite sides are joined by heat sealing.

16. The package of claim 14, wherein said sheet of gas-permeable material is adhered to selected portions of said inner surface by penetration of portions of said layer of fusible material into said sheet of gas permeable material.

17. The package of claim 16, wherein said sheet of gas permeable material comprises kraft paper.

18. The package of claim 14, which further comprises an adhesive strip on an inner surface of one of said panels immediately adjacent the open edge portion for sealing the opening closed at the conclusion of the testing period.

19. The package of claim 13, wherein said rectangular panels are substantially the same size.

20. The package of claim 1, which further comprises a body of open cell foam material selectably insertable within said opening to maintain said opening in a standardized configuration, while eliminating the effect of any air currents within the given area on the amount of radon adsorbed by said radon collecting material.

21. The package of claim 20, which further comprises a pull tab attached to said body to facilitate removal from the opening at the conclusion of the testing period prior to closing the open edge portion.

22. The package of claim 1, wherein said panels are substantially the same size.

23. The package of claim 22, which further comprises an adhesive strip on an inner surface of one of said panels immediately adjacent the open edge portion for sealing the opening closed at the conclusion of the testing period.

24. A method of making a radon testing package, said method comprising:

provided a sheet of flexible radon barrier material having a layer of fusible material on one side;

placing a sheet of gas permeable material against a portion of the sheet of radon barrier material on the fusible material side;

adhering the sheet of gas permeable material to the sheet of radon barrier material in an adhesion pattern defining an open pocket having a pocket opening by sufficiently heating first portions of the layer of fusible material while pressing the sheet of gas permeable material and the sheet of radon barrier material together in the adhesion pattern such that fusible material penetrates into the sheet of gas permeable material;

inserting a quantity of radon collecting material into the pocket through the pocket opening;

closing the pocket opening by sufficiently heating a second portion of the layer of fusible material while pressing the sheet of gas permeable material and the sheet of radon barrier material together at the pocket opening such that fusible material penetrates into the sheet of gas permeable material;

folding the sheet of radon barrier material to define two opposing panels having facing inner surfaces of fusible material; and heat sealing opposite side edges of the two panels to form an expandable outer packet having an access opening.

25. The method of claim 24, which further comprises applying an adhesive strip for subsequent sealing of the access opening.

26. The method of claim 24, which further comprises providing a body of open cell foam material selectably insertable within the access opening.

\* \* \* \* \*